Figure 1:
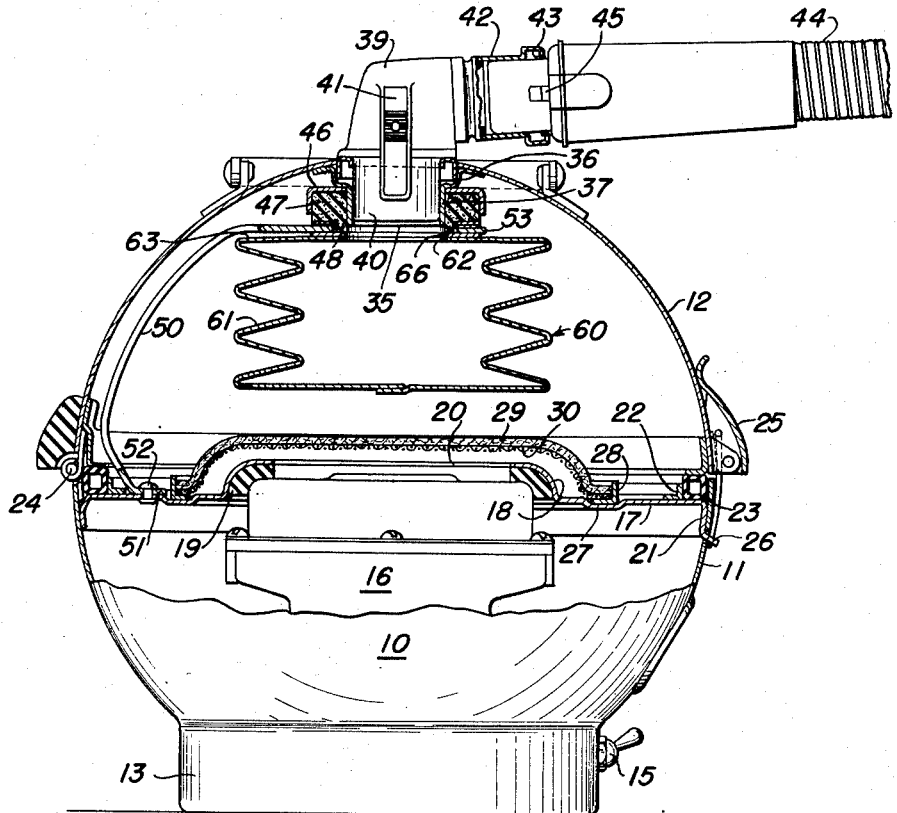

Dec. 3, 1957  W. A. HUMPHREY  2,815,090
FILTER MOUNTING MEANS

Filed Jan. 14, 1955  3 Sheets-Sheet 1

United States Patent Office 2,815,090
Patented Dec. 3, 1957

2,815,090

FILTER MOUNTING MEANS

Warren A. Humphrey, Canton, Ohio, assignor to The Hoover Company, North Canton, Ohio, a corporation of Ohio Application January 14, 1955, Serial No. 481,768

16 Claims. (Cl. 183—37)

The instant invention relates to suction cleaners and more particularly to a novel means for mounting a filter bag in a suction cleaner.

It is the prime object of this invention to provide a novel filter bag mounting means in a suction cleaner, which means is operative to maintain the filter bag mouth connected to the air inlet conduit of the suction cleaner to direct the dirty air stream into the bag.

It is a further object of the instant invention to provide a novel filter bag mounting means in a suction cleaner, which means comprises a support for suspending the filter bag within the cleaner and a seat mounting the filter bag with the mouth thereof in alignment with the dirty air stream inlet conduit of the cleaner for connection thereto, the support being operative to maintain the filter bag mouth in connection with the air inlet conduit.

It is another object of the instant invention to provide a novel filter bag mounting means in a suction cleaner, in which there is provided a support for suspending the filter bag in the cleaner, said support including an integral seat for mounting a filter bag with the mouth of the bag disposed in juxtaposition to the seat for connection with the dirty air stream inlet conduit of the cleaner, the support biasing the seat and the filter bag mouth toward the air inlet conduit for maintaining the connection therebetween. It is also a feature of the invention that the air inlet conduit includes an annular resilient gasket adapted to abut the seat surrounding the filter bag mouth to form an air-tight seal at the junction of the conduit and the filter bag mouth.

It is also an object of the instant invention to provide a novel filter bag mounting means in a suction cleaner comprising, a seat for mounting the filter bag, the filter bag including means cooperating with the seat for securing the filter bag thereto with the mouth thereof disposed in juxtaposition to the seat. In accordance with the invention the seat may comprise a flat plate with an opening therein adapted to be aligned with the filter bag mouth for providing access to the interior of the filter bag. The means on the filter bag cooperating with the seat may comprise a sleeve secured to a wall of the filter bag overlying the filter bag mouth, and including openings therein adapted to be aligned with the filter bag mouth. The dirty air stream inlet conduit is connected to the filter bag mouth through the medium of the seat, the conduit including an annular resilient gasket adapted to abut the seat and forming an air-tight seal at the junction of the air inlet conduit and the filter bag mouth. The gasket may also include a pilot portion adapted to project through the opening in the seat to contact the peripheral edge of the filter bag mouth to augment the seal at the junction of the air inlet conduit and the filter bag mouth.

It is still another object of the instant invention to provide a novel filter bag mounting means comprising a tapered seat for the filter bag and a mounting pocket on the filter bag. The seat is adapted to be received in the pocket for securing the filter bag thereto, the tapered seat wedging in the opening of the pocket to seal the pocket on the seat. In accordance with this form of the invention the filter mounting pocket is secured to a wall of the bag overlying the filter bag mouth, and in mounting the filter bag as aforementioned, the mouth is disposed in juxtaposition to the seat. The arrangement is such that the seat supports the mouth of the filter bag in position to be connected to the dirty air stream inlet conduit of the cleaner, to direct the dirty air stream into the filter bag.

Figure 3:
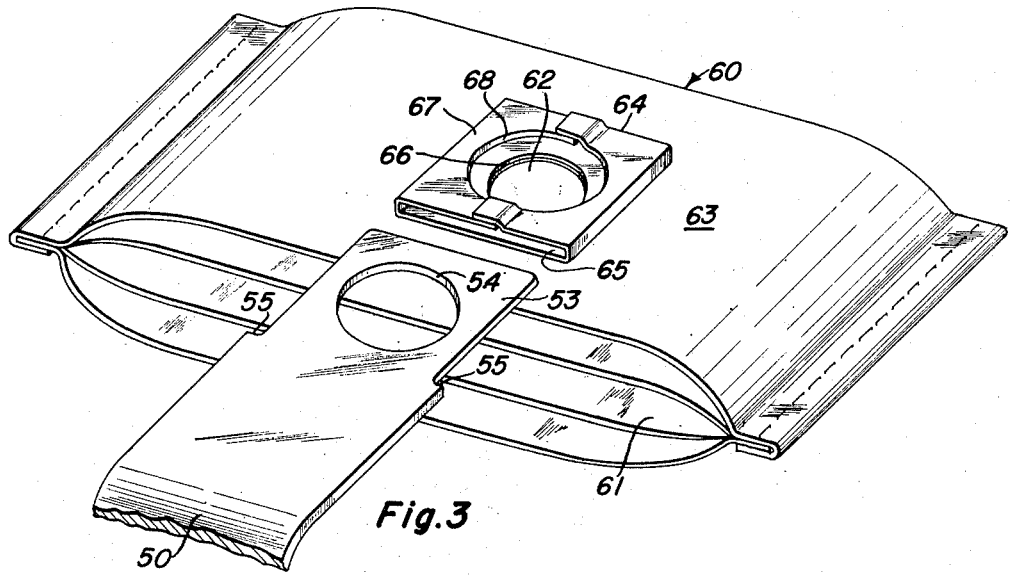
Figure 2:
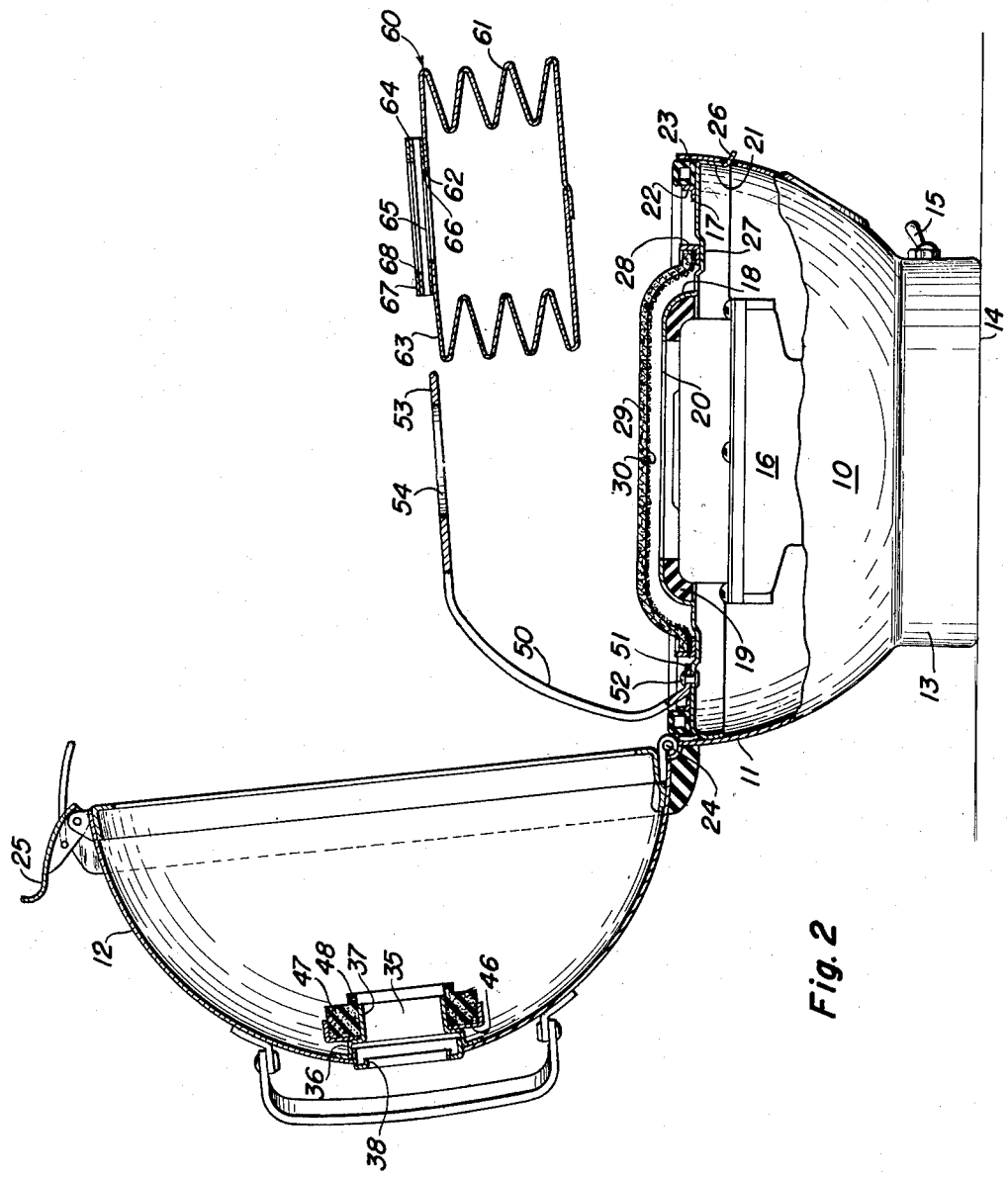
Figure 5:
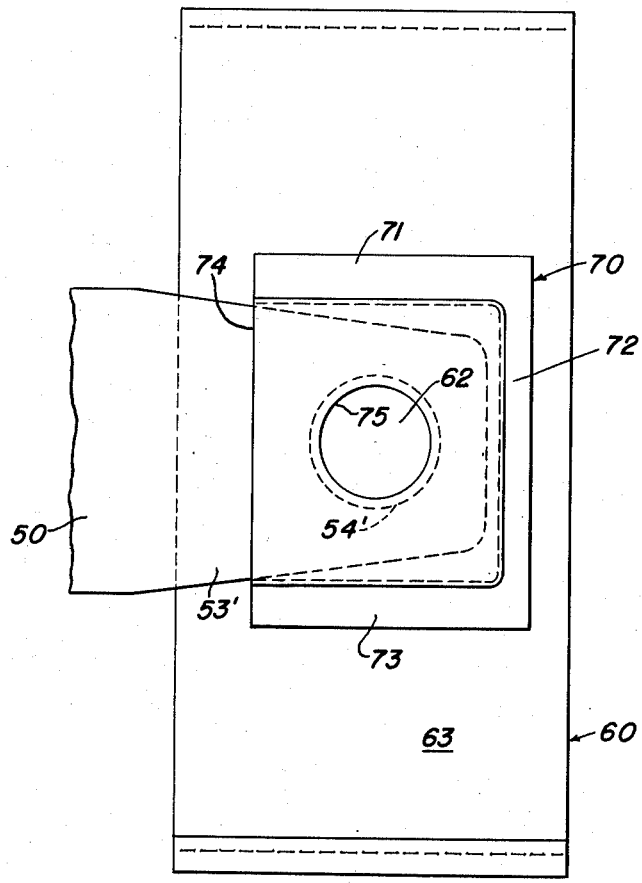
Figure 4:
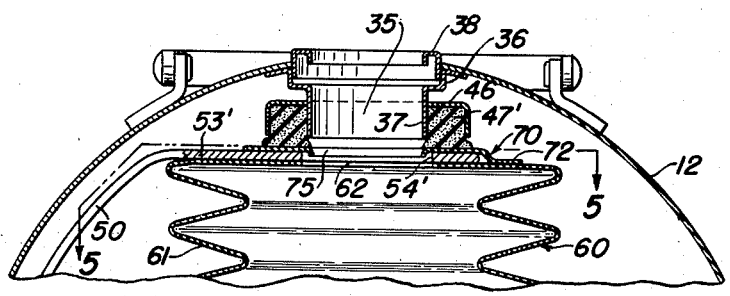

Additional objects and advantages of the instant invention will appear to those skilled in the art from a consideration of the detailed description of several preferred embodiments thereof which follows, reference being had to the drawings in which, Figure 1 is an elevational view partly in section of a spherical suction cleaner embodying the instant invention, Figure 2 is a view of the suction cleaner similar to Figure 1, with the cleaner casing sections in separated position, Figure 3 is a perspective view of the filter mounting seat and a filter adapted to be used therewith, Figure 4 is a partial elevational view in section of a modified form of the invention, and Figure 5 is a view taken on the line 5—5 in Figure 4.

Referring to the drawings, the invention is illustrated as embodied in a spherical suction cleaner 10 comprising a lower casing section 11 and an upper casing section 12, each of which is hemispherically shaped. The lower casing section 11 is formed with an integral supporting base 13 having a flat undersurface 14 for skidding the cleaner from one position to another. A conventional electrical snap switch 15 mounted on the side of the base controls the on-off operation of the cleaner. A motor-fan unit 16 of a conventional form adapted to generate a suction flow of air for gathering dust and like litter is centrally disposed in the lower casing section 11 on a resilient, vibration absorbing seat (not illustrated).

The lower casing section 11 is separated in part from the upper casing section 12 by a partition or shield 17 coextensive therewith. The partition 17 is formed with a centrally located well 18 in which is secured a resilient vibration absorbing ring 19 against which the top of the motor-fan unit 16 is seated. The central area of the well 18 is cut away leaving an opening 20 coextensive with the fan for providing communication of the suction pressure thereof to the air inlet conduit through the medium of the filters as will appear hereinafter. The peripheral edge of the partition 17 is downturned, forming an annular flange 21 lying closely adjacent the inner surface of the lower casing section 11 for securing the partition 17 therein, as by welding or like means.

An annular angle member 22 is secured to the top side of the partition 17, spaced a short distance from the wall of the lower casing section 11, and forming therewith an annular recess or seat paralleling the edge of the lower casing section 11, and in which is secured an annular gasket 23 for providing an air-tight seal between the casing sections 11, 12. The annular gasket 23 projects slightly above the lower casing section 11 for cooperation with an abutting portion of the upper casing section 12. The annular angle member 22 may be secured to the partition 17 by welding or the like.

The upper and lower casing sections 11, 12 are hingedly secured one to the other by a hinge 24 permitting pivotal separation of the casing sections, as illustrated in Figure 2. The upper casing section 12 is provided with a conventional toggle latch 25 opposite the hinge 24. The latch 25 is adapted to engage a projecting lip 26 on the lower casing section 11 for securing the two casing sections to each other with an air-tight seal therebetween. The projecting lip 26 may be formed integrally with the depending flange 21 of the partition 17.

The partition or shield 17 further includes a shallow annular recess 27 spaced a short distance from the central well 18. Seated in the recess 27 and secured to the partition as by welding or the like, is an inwardly facing annular angle member 28, providing a seat for a secondary filter 29. The secondary filter 29 is preferably made of an air pervious, fibrous material and includes a rigid backing member 30 for supporting it, and maintaining it in spaced relation to the opening 20 above the fan of the motor-fan unit 16 to communicate the suction pressure thereof to the full area of the primary filter. In the preferred construction, the rigid backing member 30 is made from loosely woven wire mesh material.

An air inlet conduit 35 is provided in the top of the upper casing section 12, centrally located therein. The conduit 35 is formed with an enlarged diameter portion 36 adjacent the wall of the upper casing section 12 and projects inwardly therefrom in a short tubular portion 37. An annular latch engaging lip 38 is secured in the enlarged diameter portion 36 of the air inlet conduit 37 in any conventional manner. A cleaning tool hose connector 39 is attached to the suction cleaner 10 by inserting the outlet end 40 thereof into the air inlet conduit 35, and engaging its spring latch 41 under the latch engaging lip 38. The inlet end 42 of the hose connector 39 includes a latch engaging lip 43 for attaching thereto a conventional cleaning tool hose 44 by engagement of the spring latches 45 under the lip 43.

An annular shelf 46 is secured to the outer surface of the air inlet conduit 35 immediately below the enlarged diameter portion 36 thereof. The shelf 46 forms with the tubular portion 37 a seat for an annular resilient gasket 47 which is secured thereto in any conventional manner. The gasket 47 is coextensive with the tubular portion 37, and the bottom thereof includes a pilot portion 48 of smaller diameter than the remainder of the gasket, projecting a short distance below the air inlet conduit 35, for a purpose to be described hereinafter.

The filter bag mounting means comprises an arm 50 projecting upwardly from the lower casing section 11 of the suction cleaner 10. The bottom of the arm 50 is formed with an integral foot 51 secured to the partition 17 in the lower casing section 11 by means of rivets 52 or the like. The arm 50 projects upwardly from the partition 17 in a gently curved section generally paralleling the inner surface of the upper casing section 12. The arm 50 terminates in a flat seat 53 for the mouth of the filter bag, disposed below the air inlet conduit 35 in alignment therewith. The seat 53 is substantially rectangular, and includes a centrally disposed opening 54 adapted to be aligned with the mouth 62 of the filter bag 60 for providing communication therewith. The seat 53 also includes oppositely disposed stop shoulders 55 for accurately positioning the filter bag mouth 62, on the seat 53 in alignment with the opening 54 therein and with the air inlet conduit 35.

Any of a number of conventional filter bags may be used with the suction cleaner embodying the instant invention. The filter bag illustrated in the drawing is of the type initially folded flat with a number of pleates 61 formed in the side walls thereof, the bag being expanded to occupy substantially the full space of the upper casing section 12 of the cleaner during operation of the motor-fan unit 16. The mouth 62 of the filter bag 60 is in one of the flat walls 63, substantially centrally disposed therein. Overlying the filter bag mouth 62 there is provided a flat sleeve 64 prefabricated from paper or the like, and having one wall 65 thereof secured to the filter bag wall 63 over an area surrounding the mouth 62. The wall 65 overlies the mouth 62 and has an opening 66 punched therein of a size equal to the diameter of the mouth 62. The opposite wall 67 of the flat sleeve 64 has an opening 68 punched therein of a size exceeding the diameter of the filter bag mouth 62, but equal to the diameter of the opening 54 in the seat 53.

The filter bag 60 is suspended on the filter mounting means with the mouth 62 thereof juxtaposed on the seat 53, by telescoping the sleeve 64 over the seat 53. The stop shoulders 55 function to accurately position the sleeve 64 on the seat 53 with the mouth 62 and the openings 66, 68 in the sleeve 64 in aligned position with the opening 54 in the seat, whereby the filter bag mouth 62 is also aligned with the air inlet conduit 35.

The sleeve 64 is of such size as to snugly embrace the seat 53 to firmly seat the filter bag mouth 62 thereon, and to contribute to the prevention of air leakage from between the seat 53 and the mouth 62.

Referring to Figure 2, it is seen that the filter bag mounting means is in its relaxed position with the seat 53 disposed at a slight angle above the horizontal. The arm 50 of the filter bag mounting means is made of relatively thin metal stock having a certain amount of inherent resiliency or springiness, and accordingly, when the upper casing section 12 is closed on the lower casing section 11 the gasket 47 surrounding the air inlet conduit 35 will bear against the seat 53 pressing it down to a horizontal position as shown in Fig. 1, in opposition to the resiliency of the arm 50. With the filter bag mouth 62 seated on the seat 53 as above described, and the casing sections 11, 12 closed on each other, there will be a firm engagement of the gasket 47, the seat 53 and the filter bag mouth 62, to provide the requisite air-tight seal at the junction of the air inlet conduit 35 and the filter bag mouth 62. The pilot portion 48 of the gasket 47 has an outer diameter equal to the diameter of the opening 54 in the seat 53; to project thereinto and bear against the periphery of the filter bag mouth 62, also contributing to the air-tight seal.

In accordance with the instant invention the novel filter mounting structure suspends the filter bag 60 entirely within the upper casing section 12. Thus when the casing sections 11, 12 are separated, as in Figure 2, for removal of the filter bag 60, the latter is completely exposed above the low casing section 11, facilitating withdrawal thereof from the seat 53. During operation of the suction cleaner the bottom of the filter bag 60 will be supported on the secondary filter 29, the latter maintaining it in spaced relation to the motor-fan unit 16, whereby the suction pressure thereof is effective over the entire filter area of the bag.

A modified form of the invention is illustrated in Figs. 4 and 5 in which the parts common to the several embodiments bear the same reference numerals, and corresponding parts are distinguished by reference numerals bearing a prime. As in the first embodiment of the invention the yieldable support 50 terminates in a laterally extending seat 53′ upon which the filter bag 60 is mounted. In the present form of the invention the seat 53′ is tapered towards its end, and the opening 54′ is the same size as the filter bag mouth 62.

The filter bag 60 is provided with a mounting pocket 70 secured to the wall 63 of the filter bag. In a preferred construction the mounting pocket 70 is formed from a rectangular piece of impervious paper or like material of substantial strength secured to the wall 63 of the filter bag by adhesion, the adhesive being applied to marginal portions 71, 72, 73 of the pocket blank. An opening 75 is punched from the pocket blank before it is adhered to the filter bag, and this opening 75 is aligned with the filter bag mouth 62 providing access to the interior of the bag. The mounting pocket 70 as thus formed on the filter bag 60 includes an opening 74 for the reception of the filter bag seat 53′.

The filter bag 60 is assembled on the filter mounting means in a manner similar to that previously described, by telescoping the mounting pocket 70 onto the seat 53′. Upon thus assembling the filter bag 60 on the tapered seat 53′, the latter will wedge into the opening 74 of the pocket drawing the edges thereof taut on the seat 53′ and providing a sealed area at the pocket opening 74, and thus preventing the leakage of air around the filter mounting seat 53′.

As in the previous embodiment the dirty air stream inlet conduit 35 has secured thereto a laterally extending shelf 46 on which is mounted a resilient gasket 47' surrounding the air inlet conduit 35. Upon joining the upper casing section 12 to the lower casing section 11, the resilient gasket 47' will abut the mounting pocket 70 in opposition to the seat 53' forming an air-tight seal at the junction of the air inlet conduit and the filter bag mouth.

The instant invention in filter bag mounting means has been described in several preferred embodiments which are merely exemplary thereof. Modifications of the invention, falling within the scope thereof, will occur to those skilled in the art. Accordingly, it is not intended that the scope of the invention be limited except as set forth in the claims which follow.

I claim:

1. In a suction cleaner having two casing sections releasably joined one to the other, one of said casing sections including a motor-fan unit for producing a suction flow of air for gathering dust and like litter, the other of said casing sections including an air inlet conduit for the admission of a dirty air stream to the cleaner, a filter bag having an inlet mouth positioned within said casing, means in said cleaner for mounting said filter bag and connecting said mouth to the air inlet conduit, said mounting means including a support for suspending the filter bag in the cleaner and being secured to said one of said casing sections, said support including a seat for the filter bag adapted to mount the filter bag with the mouth thereof aligned with the air inlet conduit, said filter including means adapted to cooperate with the seat for seating the mouth thereon in juxtaposition to the seat, and said support being made of spring material and biased to force the seat towards the air inlet conduit when said casing sections are joined together to maintain the connection of the filter bag mouth therewith.

2. In a suction cleaner as recited in claim 1 in which the air inlet conduit includes an annular gasket adapted to abut the seat in an area surrounding the filter bag mouth to form an air-tight seal at the junction of the air inlet conduit and the filter bag mouth.

3. In a suction cleaner as recited in claim 1 in which the seat is a flat plate adapted to overlie the filter bag mouth, and including an opening in the seat aligned with the mouth for providing access to the interior of the filter bag.

4. In a suction cleaner having two casing sections releasably joined one to the other, one of said casing sections including a motor-fan unit for producing a suction flow of air for gathering dust and like litter, and the other of said casing sections including an air inlet conduit for the admission of a dirty air stream to the cleaner, a filter bag having an inlet mouth positioned in said casing, means in said cleaner for mounting said filter bag and connecting said mouth to the air inlet conduit comprising, an upstanding yieldable support of spring material secured to said one of said casing sections for suspending the filter bag in the cleaner, said support including an integral seat extending laterally thereof, said filter bag being mounted on the seat with the mouth disposed in juxtaposition to said air inlet, said filter bag including means adapted to cooperate with the seat for seating the filter bag thereon, and said seat being biased by the support towards the air inlet conduit when said casing sections are joined together for maintaining the connection of the filter bag mouth with the air inlet conduit.

5. In a suction cleaner having two casing sections releasably joined one to the other, one of said casing sections including a motor-fan unit for producing a suction flow of air for gathering dust and like litter and the other of said casing sections including an air inlet conduit for the admission of a dirty air stream to the cleaner, a filter bag having a mouth positioned in said cleaner, means in said cleaner for mounting said filter bag comprising, a yieldable support of spring material secured to said one of said casing sections for suspending the filter bag within the cleaner, said support including a seat adapted to mount the filter bag, said filter bag including a mounting sleeve adapted to receive the seat for securing the filter bag thereto with the mouth disposed in juxtaposition to the seat, said yieldable support biasing the seat and the filter bag mouth towards the air inlet conduit and maintaining the connection of the mouth with the conduit when said casing sections are joined together.

6. In a suction cleaner as recited in claim 5 in which the seat is a flat plate with an opening adapted to be aligned with the filter bag mouth, and said mounting sleeve overlies the filter bag mouth and includes an opening aligned therewith.

7. In a suction cleaner as recited in claim 6 in which the seat includes stop shoulders for positioning the sleeve thereon and aligning the filter bag mouth with the opening in the seat.

8. In a suction cleaner including a separable casing section having a dirty air stream inlet conduit, and a filter bag having a mouth adpated to be connected to the conduit for directing a dirty air stream thereinto, said casing section being separable from the cleaner to expose the filter bag for removal, means for mounting the filter bag in the cleaner comprising a yieldable support of spring material for suspending the filter bag within the cleaner, said support including an arm extending upwardly from the cleaner into said separable casing section and a seat for the filter bag, means on the filter bag adapted to mount the bag on the seat with the mouth disposed in juxtaposition thereto, said seat aligning the filter bag mouth with the air inlet conduit upon joining said separable casing section to the cleaner, said yieldable support biasing the seat and the filter bag mouth towards the air inlet conduit and maintaining the connection of the air inlet conduit with the filter bag mouth when said casing section is joined to the cleaner.

9. In a suction cleaner including a casing having a dirty air stream inlet conduit, a filter bag having an inlet mouth in alignment with said inlet conduit, means for mounting said filter bag comprising, a yieldable support of spring material for suspending the filter bag within the cleaner, said support including an arm extending upwardly within said casing to adjacent said inlet conduit and an integral seat for said filter bag, means on said filter bag cooperating with said seat for mounting the filter bag thereon with the filter bag mouth aligned with the air inlet conduit, said yieldable support biasing the seat and the filter bag mouth towards the air inlet conduit for connecting the air inlet conduit and the filter bag mouth to direct the dirty air stream thereinto when said casing is secured to the cleaner.

10. Means for mounting a filter bag in a suction cleaner as recited in claim 9, in which said seat comprises a flat plate adapted to mount the filter bag with the mouth disposed in juxtaposition thereto, said plate including an opening aligned with the filter bag mouth and providing access thereto.

11. In a suction cleaner as recited in claim 10, in which said filter bag includes a flat sleeve overlying the filter bag mouth adapted to be telescoped on the seat, said sleeve including an opening aligned with the filter bag mouth and with the opening in the seat, and stop shoulders on said seat for positioning the sleeve on the seat.

12. Means for mounting a filter bag as recited in claim 10, in which said seat is tapered, and said filter bag includes a mounting pocket overlying the filter bag mouth, said seat being adapted to be received within the pocket and wedging in the opening thereof to seal the pocket on the seat.

13. Means for mounting a filter bag in a suction cleaner having a dirty air stream inlet conduit comprising, a filter bag having an inlet mouth in juxtaposition to said inlet conduit, a seat for said filter bag, and means on said filter bag cooperating with said seat to mount the filter bag thereon with the mouth of the filter bag disposed in juxtaposition to the seat, said seat including an opening of greater diameter than the filter bag mouth aligned with the mouth, means for connecting the air inlet conduit to the filter bag mouth, a resilient gasket surrounding the air inlet conduit adapted to abut the seat to form an airtight seal between the air inlet conduit and the filter bag mouth, said gasket including a pilot portion projecting within the opening in the seat and abutting the periphery of the filter bag mouth.

14. In a suction cleaner as recited in claim 13, in which the seat comprises a flat plate, and the filter bag means cooperating with the seat comprises a sleeve overlying the mouth, said sleeve including an opening aligned with the mouth and of substantially the same size as the opening in the seat.

15. A suction cleaner including a casing, a motor-fan unit for drawing dirt laden air through a portion of said cleaner, said cleaner being formed to provide a passage for the dirt laden air, said passage including a fitting having an opening through which dirt laden air passes, a filter bag positioned in the dirty air stream and positioned to receive air from said fitting and having an inlet opening in one wall thereof, mounting means for supporting said filter bag with said inlet opening in alignment with the opening in said fitting, said supporting means comprising an arm extending upwardly in said casing to adjacent said fitting and complemental plate and channel members having an opening therethrough in alignment with said inlet opening and the opening in said fitting when in their supported position, one of said members being attached to said bag with its opening in alignment with said inlet opening and the other being supported from said cleaner in proximity to the opening in said fitting and said arm being made of spring material and arranged to press said mounting means against said fitting to form a seal therewith.

16. A suction cleaner according to claim 15 in which said mounting means is made of spring material and is arranged to press one of said members against said fitting.

References Cited in the file of this patent

UNITED STATES PATENTS

| 808,170 | Rogers | Dec. 26, 1905 |

FOREIGN PATENTS

| 17,705 of 1913 | Great Britain | Aug. 1, 1913 |
| 469,379 | Great Britain | July 23, 1937 |